United States Patent [19]
Smith et al.

[11] Patent Number: 5,516,976
[45] Date of Patent: May 14, 1996

[54] SULPHATE AGGLOMERATION

[75] Inventors: Neil L. Smith, Oakville; Gregory J. Saunders, Sudbury, both of Canada

[73] Assignee: Southwind Enterprises Inc.

[21] Appl. No.: 295,056

[22] Filed: Aug. 26, 1994

[51] Int. Cl.$^6$ ................................................. C22B 1/243
[52] U.S. Cl. .............................. 588/257; 75/747; 405/288
[58] Field of Search .................................. 588/249, 250, 588/257; 405/128, 129, 288; 75/747, 770, 773

[56] References Cited

U.S. PATENT DOCUMENTS

| | | | |
|---|---|---|---|
| 1,990,948 | 2/1935 | Loghry . | |
| 3,789,097 | 1/1974 | Beck et al. | 75/768 |
| 4,049,444 | 9/1977 | Bell et al. | 75/10.67 |
| 4,266,971 | 5/1981 | Schwartz et al. | 75/696 |
| 4,544,542 | 10/1985 | Angevine et al. | 423/555 |
| 4,666,694 | 5/1987 | Jons et al. | 423/555 |
| 4,802,919 | 2/1989 | Fey . | |
| 5,100,464 | 3/1992 | Kelly et al. . | |
| 5,104,446 | 4/1992 | Keough et al. | 75/755 |
| 5,116,417 | 5/1992 | Walker et al. | 75/327 |
| 5,276,254 | 1/1994 | Breen et al. | 588/256 |
| 5,385,602 | 1/1995 | Keough et al. | 75/766 |

Primary Examiner—Randolph A. Reese
Assistant Examiner—John A. Ricci
Attorney, Agent, or Firm—Bereskin & Parr

[57] ABSTRACT

A process for forming agglomerates of metallurgical dust containing metal sulphates for recycling to extractive processes includes adding lime particles and a small amount of water, forming a mixture and extruding the damp mixture and allowing the extruded agglomerates to become hard and shape retentive. The material agglomerated may be water soluble metal sulphate containing particles or mixtures of such particles with other value metal bearing waste or by-products of metallurgical processes. Optionally additional binding agents comprising cement and hydrocarbonaceous substances such as wax may be added to the mixture.

14 Claims, No Drawings

SULPHATE AGGLOMERATION

FIELD OF THE INVENTION

This invention relates to agglomeration of particles, more particularly metal sulphate bearing particles, for recycling to extractive process stages in metallurgical operations, or for storage under environmentally acceptable conditions.

BACKGROUND TO THE INVENTION

There is a growing demand for methods which allow the recycling of particles such as dust, larger particles and pieces, that contain extractable metal values, to processes for recovering such metal values. The dust and particles under consideration often include by-products and waste products of various metallurgical refining, gas cleaning, metal working and various other metallurgy-related operations. A particularly metal rich by-product of metallurgical operations contains sulphates of value metals. The metal sulphates are often very fine and can be easily blown away by the updraft in the converter or similar metallurgical extractive installation when attempts are made to feed or charge them to such installations. Thus there is a need for an inexpensive method for forming shape-retaining agglomerates of value metal sulphate containing particles.

Metal sulphate containing fine particles are in some instances to be stored, transported or are to be used as backfill. The fine particles can easily be blown away by wind or draft and thus need to be agglomerated and anchored for environmental reasons.

It is to be noted that calcium sulphate is one of the products of several known processes for capturing and absorbing sulphurous oxides contained in exhaust and flue gases in metallurgical processes. Such absorption is usually conducted by limestone, calcium and magnesium oxides and hydroxides, and carbonates, and similar alkali and alkaline earth metal containing absorbents. The by-and waste products of such processes are usually predominantly calcium sulphate, other metal sulphates are only present as impurities. In other words, conventional sulphurous gas absorbing processes yielding calcium sulphate and/or gypsum which may be agglomerated in a subsequent step, are not considered to be relevant to the products to be treated in the present process, nor to the discussion with respect to the operation and implementation of the present invention.

SUMMARY OF THE INVENTION

A process for agglomerating loose metal sulphate containing particles, thereby rendering the metal sulphate containing particles suitable as feedstock in a metal extractive process, comprising the steps of:
 (a) making a mixture of loose particles containing metal sulphates which are at least partially water soluble, and lime particles;
 (b) admixing water to said mixture in an amount that does not exceed the amount of water said mixture is capable of absorbing, thereby obtaining a damp mixture, and
 (c) extruding the damp mixture so obtained into agglomerates and allowing said agglomerates to become hard and shape retentive.

It is to be noted that although water soluble sulphates of group 1A, 2A and 3B metals are included in the above process steps, these metals are not normally recovered by conventional metal extractive processes. Group 1A, 2A and 3B metal sulphates may be present in small amounts without interfering with the products of the process or with the recovery of the value metals in the metal sulphate particles.

DETAILED DESCRIPTION OF THE PREFERRED EMBODIMENTS

As discussed above, this process is designed to obtain agglomerates containing metal sulphates for charging to one of the extractive metallurgical process steps for the recovery of the metal in the metal sulphate. The agglomerates obtained may also be utilized in transporting or in storage of the agglomerated sulphates and if appropriate, to be utilized in filling up mine cavities, a process generally known as mine backfill operation.

Metal sulphates are often present as by-products obtained in metallurgical operations and processes. One such by-product is the sediment and slime obtained and collected in the bottom of vats, tanks and similar containers in electrolytic refining steps. The sediment and slime often contains a significant portion of various metal sulphates in the shape of fine particles. The fine particles may be predominantly one kind of metal sulphate, such as for example, nickel sulphate produced as by-product in the electrolytic refining of copper or nickel, but more often the particles contain a mixture of metal sulphates, together with oxides deposited separately or as basic metal sulphates, and even fine particles of precious metals. When dried, such sulphates are usually in the form of very small sized particles, and are thus very difficult to handle.

Metal sulphates may also be present in dust collected by electrostatic precipitators, also known as Cottrell-dust, resulting from reaction of sulphurous gases with fine particles of oxides carried by the exhaust gases. Metal sulphates may also be present in fumes and waste-products of processes having different objectives.

Metal sulphates may occur in the waste products of photographic processes or in processes which utilize metal or metal oxides as catalysts.

Metal sulphates may also be found in sufficiently large quantities to render recovery economically feasible, in the residues of various leaching processes. Furthermore, any treatment of metals or metal compounds with sulphuric acid which results in metal sulphate formation, more particularly base metal sulphate formation, may yield a metal sulphate as solid metal sulphate, which may then be recycled to metal recovery. Metals which are of particular interest to be recycled include nickel, copper, cobalt, silver, chromium, zinc and metals which are often referred to as transition metals. Value metal sulphates suitable for recovery may also be found in sludges obtained by various industrial processes.

The above are just a few of the more common processes which provide value metal sulphate which may be economically recoverable in a recycling operation. There may be many other sources for value metal sulphates which a skilled person would be familiar with.

Most of the above discussed metal sulphates are either fully or partially water soluble, but when dried may in part decompose to oxides, and in any case, are usually in the form of very small size such as 20 or 50 micron particles. As discussed above, such metal compound containing metal sulphate particles are too fine for charging to metal extractive process steps and need to be agglomerated by relatively inexpensive methods.

It is an important prerequisite of the present process that the metal sulphates which are included in the metal sulphate containing particles, be at least partially water soluble. The sulphates of most base metals, with the exception of lead, are known to be water soluble.

In one embodiment of the process, the particles containing value metal sulphate are mixed with lime preferably also in the form of fine particles. Sufficient water is then added to the fine particles to render the resulting mixture damp. The amount of water which is added is referred to hereinbelow as that which the mixture of solid particles is capable of absorbing. Excess water, that is such that results in the formation of a slurry, is to be avoided.

If convenient, the lime may be first made into a thick watery slurry and then mixed with the fine metal sulphate containing particles. The water content of the lime containing slurry, however, has to be carefully controlled and adjusted such that the resulting mixture of lime and sulphate containing particles is a damp mixture and no excess water is present. Expressed in other words, for best results, the mixture of sulphate containing particles and lime does not contain water as a separate phase.

The amount of lime added is usually between 5–10 wt. % and the water is usually between 8 and 18 wt. %, taking the made up mixture as 100 wt. %. The preferred lime content is 5 to 7 wt. %, and the preferred amount of water added, depending upon the nature and size of the metal sulphate containing particles, is 9 to 12 wt. %. Occasionally the metal sulphate is acidic and lime addition is elevated to beyond 10 wt. % to neutralize the agglomerate for acceptable re-entry into the metal extraction process.

If desired, a portion of the lime added may be replaced with dolomite or with burnt dolomite.

In some instances, the metal sulphate may be added as a gel or as a thick aqueous slurry, then no water or less water is needed to be admixed for best results.

The damp mixture is extruded by conventional means. The extrusion step preferably immediately follows the mixing step. The size and shape of the extruded agglomerates is determined by convenience only. The extruded agglomerates or extrudates, may have diameters or cross-sectional dimensions ranging from a fraction of an inch to several inches.

It may be convenient to conduct the mixing of the components of the mixture and the extrusion in one installation, such as for example, an extrusion press, in a combined single step. This, however, is not mandatory, as long as the time interval between the mixing and the extrusion is not unduly long.

The extruded agglomerates are capable of shape retention and stockpiling, but are usually not yet hard. The extruded agglomerates obtain sufficient strength to be mechanically handled without dusting or breakage within 20 to 30 minutes. The extrudates will continue to cure over a period of days.

By way of explanation of the instant process, but without considering the explanation binding, the water added will dissolve a portion of the metal sulphate present in the particles, react chemically with the lime, and the sulphate be immediately precipitated as insoluble calcium sulphate. The calcium sulphate forms a skin around the undissolved metal sulphate containing particles, thereby forming agglomerates within a matrix of precipitated calcium sulphate. In the first instance calcium sulphate hemihydrate is formed ($CaSO_4 \cdot H_2O$), which then converts to gypsum ($CaSO_4 \cdot 2H_2O$) within a day or two by chemically taking up or binding any further unbound water present in the mixture.

In another embodiment the sulphate containing particles are mixed with other value metal containing waste or by-product of the metallurgical industry, to obtain an extruded agglomerated product which may be recycled to a metal extractive process step for metal recovery.

The ratio of metal sulphate containing particles to the metal containing waste or by-product is dictated by convenience.

Lime and water are then admixed with the mixture of sulphate containing particles. The mixing of the metal sulphate containing particles and the metal containing waste or by-product, the mixing of lime and water in a slurry and the subsequent mixing of the lime slurry with the first mixture may be conducted as three successive steps. Alternatively, the mixture may be obtained in a single step wherein the sulphate containing particles, value metal containing waste or by-product, lime and water are mixed together in an appropriate apparatus. In whichever way or sequence the process is conducted, care needs to be taken that no excess water is present in the mixture. The resulting mixture needs to be damp, however, as was stated above, water should not be present as a separate phase. The mixture is then extruded into extruded agglomerates or extrudates of convenient size. The extrudates are expected to obtain the hardness suitable for rough mechanical handling within 24 hours or less depending on the amount of metal sulphate present. A mixture is made up to contain 5–10 wt. % lime with the preferred range being 5–7%, 8–18% water, the preferred range being 8–14%, and a balance of metal sulphate containing particles and value metal containing metallurgical waste or by-products. As before, the lime addition may be elevated to neutralize the acidic nature of some metal bearing sulphates or wastes.

In a third embodiment of the present novel process, additional binding agents are added to a mixture of value metal sulphate containing particles and value metal bearing waste or by-product of metallurgical processes. The additional binding agents comprise cement and a hydrocarbonaceous substance. The cement may be conventional cement, such as portland cement and/or slag cement, or even flyash. The hydrocarbonaceous substance is usually a hydrocarbon based material such as wax, bitumen and such which melts at a temperature higher than 140° F. (55° C.). Agglomeration of metallurgical waste and by-products with cement and wax is described in our co-pending U.S. patent application Ser. No. 08/050,790 under the title Agglomeration by Extrusion which was filed on Apr. 22, 1993. The metal sulphate containing particles may also have cementious properties, such particles may be, for example, Cottrell-dust obtained in electrostatic precipitators, or even the metallurgical waste or by-product that may contain cementious substances. In any case, there may be a need to add cement in order to supplement the agglomerating property resulting from the utilization of the reaction between the metal sulphates and lime added to the mixture. The hydrocarbonaceous substance is added to further enhance the working of the present process for obtaining extruded agglomerates which are to be recycled to metal extractive process steps.

A mixture containing metal sulphate containing fine particles, lime which may be in the form of an aqueous slurry, metallurgical waste and/or by-product, cement, a hydrocarbonaceous substance and water added in amounts that will produce a damp mixture, are usually made up in a single mixing step. The mixing, however, may also be conducted in several convenient stages. The composition of the mixture regarding the ratio of the metal sulphate containing particles to the metallurgical waste and by-product is dictated by convenience only. Lime is added usually in the same range as specified in the above-described embodiment or less, depending on the amount of metal sulphate present in the mixture. In adding water either as a separate component, or in the form of a slurry of lime, it is of importance that no water is present in the mixture as a separate phase.

It should be borne in mind that both lime and cement in the mixture are kept at what is to be considered as the minimum, and at any rate at low levels, so that the slag burden in the metal extractive process step is not increased unnecessarily. Furthermore, the process costs are also to be kept low by not adding more binding agents than necessary. Elevated levels of lime and cement are usually only dictated by high acidity levels in some metal sulphates and metal bearing wastes.

The above mixture is extruded into suitable size extruded agglomerates or extrudates, and allowed to acquire hardness in 6 to 24 hours.

The extruded agglomerates are to be handled by conventional equipment and may be charged to furnaces and converters without crumbling or dusting.

EXAMPLE 1

Metal sulphate containing fine particles obtained as by-product in electrolytic metal winning process, containing predominantly nickel sulphate and minor amounts of other base metal sulphates, was mixed with lime and water. The composition of the mixture was as follows:

metal sulphates—82 wt. %
lime—8 wt. %
water—10 wt. %

The mixture was made up in a "MULLER" (Trademark) mixer until achieving sufficient plasticity for extrusion, then fed immediately to an extruder to be extruded as one inch diameter slugs. The slugs completely retained their shape after extrusion and were immediately suitable for travel on a conveyor to a bagging operation. As an alternative, the slugs could be handled by a front end loader without dusting or crumbling after 20 to 30 minutes.

EXAMPLE 2

A mixture was made of a commercially available metallurgical waste product containing nickel, copper and iron, and nickel sulphate containing particles obtained as a by-product of an electrowinning process. The mixture was made up to contain nickel containing waste product and nickel sulphate containing by-product in the ratio of 2:1. To this mixture lime, Type 30 portland cement, hydrocarbonaceous wax and water were added in the following amounts:

lime—4 wt. %
Type 30 portland cement—7 wt. %
wax (Imperial Oil No. 778)—3 wt. % water—18 wt. %, the balance being nickel containing waste product mixed with nickel sulphate containing by-product in a ratio of 2:1.

The mixture was immediately extruded, subsequent to mixing, into one inch slugs. The extruded slugs retained their shape and were suitable for transport on a conveyor to a curing stockpile. Hardening for handling by a front end loader without dust and breakage was attained in 6 to 24 hours.

It has been demonstrated that water soluble base metal sulphate containing waste products may be readily agglomerated and extruded into extrudates which then may be recharged or fed to metal recovery extractive process steps. The process may be conducted in conventional apparatus and with relatively inexpensive additives and agglomerating agents. The extrudates obtained can be handled with mechanical equipment within a range of from a few minutes to a few hours of the extrusion having taken place.

We claim:

1. A process for agglomerating loose metal sulphate containing particles, thereby rendering the metal sulphate containing particles suitable as feedstock in a metal extractive process, comprising the steps of:
   (a) making a mixture of lime particles and loose particles containing metal sulphates which are at least partially water soluble, said metal sulphate in said metal sulphate containing particles being at least one of the group consisting of ferrous sulphate, ferric sulphate, nickel sulphate, copper sulphate, tin sulphate, chromium sulphate, manganese sulphate, zinc sulphate, cobalt sulphate, aluminium sulphate, titanium sulphate and silver sulphate,
   (b) admixing water to said mixture in an amount that does not exceed the amount of water said mixture is capable of absorbing, thereby obtaining a damp mixture, and
   (c) extruding the damp mixture so obtained into agglomerates and allowing said agglomerates to become hard and shape retentive.

2. A process as claimed in claim 1, wherein said damp mixture obtained in step (b) contains lime: 5–10 wt. %, water: 8–18 wt. %, the balance being loose metal sulphate containing particles.

3. A process as claimed in claim 2 for agglomerating metal sulphate containing particles, whereby the agglomerated extruded metal sulphate containing particles are transported and utilized in mine back fill.

4. A process as claimed in claim 1, wherein said metal sulphates also contain metal oxides and said metal oxides are also comprised in said extruded agglomerates obtained in step (c).

5. A process as claimed in claim 4, wherein said damp mixture obtained in step (b) is further admixed with a hydrocarbonaceous substance having melting point higher than 140° F. prior to being extruded in step (c).

6. A process as claimed in claim 1, wherein metallurgical by-products, including metal oxide particles resulting as by-products of metallurgical processes, are additionally mixed in with said mixture of loose particles containing metal sulphates and lime particles prior to admixing water to said mixture, and said metallurgical by-products are also comprised in said extruded agglomerates obtained in step (c).

7. A process as claimed in claim 6, wherein said damp mixture obtained in step (b) contains lime: 5–10 wt. %, water: 8–18 wt. %, the balance being a mixture of loose metal sulphate containing particles and a metallurgical by-product.

8. A process as claimed in claim 7, wherein the loose metal sulphate containing particles and the metallurgical by-products are present in said damp mixture in a ratio of 1:2.

9. A process as claimed in claim 7, wherein said mixture of loose particles containing metal sulphates and lime particles and additionally mixed in metal oxide particles or metallurgical by-products, prior to being admixed with water, is further mixed with fine cementious silicate containing particles selected from the group consisting of silicate containing fumes, silicate containing calcined dust, portland cement, flyash, and slag cement, and the mixture so obtained is admixed with water in an amount that does not exceed the amount said mixture is capable of absorbing, thereby obtaining a damp mixture.

10. A process as claimed in claim 9, wherein said damp mixture so obtained is further admixed with a hydrocarbonaceous substance having melting point higher than 140° F. prior to being extruded as agglomerates.

11. A process as claimed in claim 6, wherein said mixture of loose particles containing metal sulphates and lime particles and additionally mixed in metal oxide particles or metallurgical by-products, prior to being admixed with water, is further mixed with fine cementious silicate containing particles selected from the group consisting of silicate containing fumes, silicate containing calcined dust, portland cement, flyash, and slag cement, and the mixture so obtained is admixed with water in an amount that does not exceed the amount said mixture is capable of absorbing, thereby obtaining a damp mixture.

12. A process as claimed in claim 11, wherein said damp mixture so obtained is further admixed with a hydrocarbonaceous substance having melting point higher than 140° F. prior to being extruded as agglomerates.

13. A process as claimed in claim 6, wherein said damp mixture obtained in step (b) is further admixed with a hydrocarbonaceous substance having melting point higher than 140° F. prior to being extruded in step (c).

14. A process as claimed in claim 1, wherein said damp mixture obtained in step (b) is further admixed with a hydrocarbonaceous substance having melting point higher than 140° F. prior to being extruded in step (c).

* * * * *